United States Patent
Lavi

(10) Patent No.: US 8,706,103 B2
(45) Date of Patent: Apr. 22, 2014

(54) METHOD AND APPARATUS FOR SYNCHRONIZING CHANGES IN POWER SAVING PROCEDURES

(75) Inventor: Nadav Lavi, Rishon LeZion (IL)

(73) Assignee: Sparkmotion Inc., Ottawa (CA)

( * ) Notice: Subject to any disclaimer, the term of this patent is extended or adjusted under 35 U.S.C. 154(b) by 808 days.

(21) Appl. No.: 12/187,566

(22) Filed: Aug. 7, 2008

(65) Prior Publication Data

US 2009/0042553 A1 Feb. 12, 2009

(30) Foreign Application Priority Data

Aug. 7, 2007 (IL) .......................................... 185088

(51) Int. Cl.
*H04M 3/00* (2006.01)
(52) U.S. Cl.
USPC ......... 455/419; 455/574; 455/343.4; 370/311
(58) Field of Classification Search
USPC ............ 455/574, 419, 343.2–343.4; 370/311
See application file for complete search history.

(56) References Cited

U.S. PATENT DOCUMENTS

| | | | |
|---|---|---|---|
| 2007/0218939 A1* | 9/2007 | Lim et al. ....................... | 455/528 |
| 2008/0062923 A1* | 3/2008 | Ponnuswamy ............... | 370/331 |

\* cited by examiner

*Primary Examiner* — Marcos Torres
(74) *Attorney, Agent, or Firm* — Procopio, Cory, Hargreaves & Savitch LLP

(57) ABSTRACT

A method and devices are provided for use in a wireless communications network for affecting changes in a power saving class (PSC) associated with a subscriber terminal. The method comprises the steps of: providing at least one PSC for use by said subscriber terminal; at each of said subscriber terminal and said corresponding base station, setting a counting value for said at least one PSCs to be equal to a pre-defined initial value; and upon transmitting or receiving at either one of said subscriber terminal and said base station a message identifying a change in said at least one PSC, updating operating parameters associated with said at least one PSC and increasing at the respective subscriber terminal or base station, the counting value of the corresponding one or more of said at least one PSC by a pre-determined value. Preferably, the method further comprises transmitting a message which comprises a request to affect a change in power saving status of said subscriber terminal, wherein the message comprises an indication of the counting value associated with a PSC currently available at the side transmitting said message; and upon receiving the message comprising the request to affect a change in the power saving status, determining whether the counting value comprised in the message matches the counting value at the side transmitting that message, and if in the affirmative, evaluating whether the requested change may be carried out.

12 Claims, 3 Drawing Sheets

METHOD AND APPARATUS FOR SYNCHRONIZING CHANGES IN POWER SAVING PROCEDURES

FIELD OF THE INVENTION

The present invention relates to method and device adapted for use in mobile and stationary wireless terminals, and more particularly to wireless terminals implementing a sleep mode power saving method.

BACKGROUND OF THE INVENTION

The IEEE Recommendation 802.16e presents a new method of power-saving for mobile as well as stationary wireless terminals named sleep-mode. Using the sleep-mode method, terminals can operate in a virtually infinite sequence of listening and sleeping windows, where during listening windows the terminals operate in a normal-mode while during sleeping windows the terminals cannot transmit data and do not expect to receive data, hence they can implement power saving scheme during this time window.

Sleep-mode is aimed to support various traffic patterns and applications, such as unicast and multicast services, VoIP, web traffic, etc. It includes three types of power-saving schemes: one with increased sleeping windows, a second with constant sleeping windows, and a third with a single sleep window operation. In addition, the sleep-mode defines triggers for automatic self deactivation: such as BW request and data transfer during the sleep-mode operation.

For mobile and stationary wireless terminals Sleep-mode is operated using the definition of activation and deactivation of Power Saving Class(es) (hereinafter "PSC"). Every PSC defines a type of operation (from among the three possible scheme types described above), the associated connections, the operating sequence (sleeping and listening windows), and the automatic deactivation triggers. When a PSC is first defined, it is given a unique 6 bits ID, named Power_Saving__Class_ID. By using the Power_Saving_Class_ID, both the terminal and the associated Base Station (BS), may activate and deactivate the PSC, and re-define it.

As mentioned above, sleep-mode operation can be activated and deactivated by either side of the communication link, (i.e. either by the BS or by the terminal). In such a case, the terminal would transmit a MOB_SLP-REQ message, requesting information that concerns the activation, definition and deactivation of a certain PSC. Upon receipt of the request message, the BS responds by sending a MOB_SLP-RSP message, indicating to the terminal whether the request has been approved. On its part, the BS can also transmit to the terminal a MOB_SLP-RSP in an unsolicited manner, instructing the terminal to activate or deactivate a certain PSC, defining a new PSC, or re-defining an existing PSC.

Due to the nature of the protocol (both request-respond transaction and unsolicited response transaction), taken together with the unreliable characteristics of the wireless interface, it is possible that definitions and re-definitions packets will be lost. Therefore, it is possible that the BS and terminal hold different views of the PSC definitions. Consequently, when the PSC is activated the BS holds and maintains a different windows sequence than the terminal. This scheme synchronization problem might cause the BS to send data to the terminal when the latter is in a sleeping window, which in turn would lead to loss of data, and ultimately resulting in degradation of the BS's performance.

IEEE recommendation 802.16e defines the concept of sleep-mode but does not provide a proper solution to the synchronization problem described above.

WO 06/040769 describes a method for carrying out a power saving procedure in a terminal receiving a number of different services, each belonging to a different PSC. The method comprises determination of required listening windows and required sleep windows for each of the power saving classes, and calls for exchange of messages between the base station and the terminal for synchronizing parameters in order to carry out a power saving procedure.

In IEEE Recommendation 802.16d/e some MAC messages, such as: UCD, DCD, and MOB_NBR-ADV, include a parameter named Configuration Change Count (CC) that ensures proper terminal tracking of the BS configuration changes. By this mechanism the BS increment the CC upon changes in its configuration and transmit the new value in the next UCD and DCD messages. The terminal can then compare the CC value with the one stored in its memory to verify if its configuration parameters are up-to-date.

SUMMARY OF THE INVENTION

It is therefore an object of the present invention to provide a method and means to synchronize the sleep mode windows of both the subscriber terminal and its associated base station.

It is another object of the invention to provide a method that allows tracking of changes affected to a Power Saving Class (PSC), including releasing or deleting a PSC.

Other objects of the present invention will become apparent from the following description.

According to a first embodiment of the present invention there is provided a method for use in a wireless communications network for affecting changes in a power saving class (PSC) associated with a subscriber terminal, the method comprises the steps of:

providing at least one PSC for use by the subscriber terminal;

at each of the subscriber terminal and the corresponding base station, setting a counting value for the at least one PSCs to be equal to a pre-defined initial value; and upon transmitting or receiving at either one of the subscriber terminal and the base station a message identifying a change in the at least one PSC, updating operating parameters associated with that at least one PSC and increasing at the respective subscriber terminal or base station, the counting value of the corresponding one or more of the at least one PSC by a pre-determined value.

Preferably, the method provided further comprises the steps of:

transmitting a message comprising a request to affect a change in the power saving status of the subscriber terminal, wherein the message comprises an indication of the counting value associated with the PSC currently available at the side transmitting that message; and upon receiving the message comprising the request to affect the change in the power saving status, determining whether the counting value comprised in the message is the counting value matches the one at the side transmitting the message, and if in the affirmative evaluating whether the requested change can be carried out.

Thus, this embodiment of the present invention enables keeping synchronization between the PSCs' definitions at the subscriber terminal and the BS associated therewith.

According to another preferred embodiment of the present invention, the subscriber terminal is operative in accordance with at least two different power saving classes (PSCs), each of which is associated with respective traffic related characteristics, and the message transmitted in the step of transmitting a message comprising a request to affect a change in the power saving status, comprising identifying the PSC for which the request for a change was transmitted.

Preferably, the counting value for each of the PSCs is initialized and set to zero upon the definition of the PSC, and incremented upon every re-definition, say be 1 (or by any other pre-defined value). As will be appreciated by those skilled in the art, although the counting value is increased at both end (i.e. at the subscriber terminal and at the BS) by the same increment, it should be understood that the present invention is not restricted to such an increase, and encompasses also cases where the increase at the subscriber terminal is not identical to that in the base station. However, in such cases, each of these two entities has a prior knowledge to enable converting the PSC counting value of the other, to the scale it uses. For example, if each increment at the base station is equal to 2 and at the subscriber terminal to 1, if the message received by the subscriber terminal identifies that the counting value of that PSC at the base station is equal to 6, the subscriber terminal would be able to establish that if its own counting value for that PSC is 3, then the PSC configuration at both ends of the link is synchronized.

In the alternative, the counting value is incremented only upon establishing that the re-definition of the PSC has succeeds at both sides of the link, in other words after both sides received the re-definition message and now holding the same counting value and PSC parameters at both ends of the link.

Also, as will be appreciated by those skilled in the art, the increase in the counting value could be different for various PSCs and implementing such method should be considered to be encompassed by the present invention.

When a re-definition of a PSC does not succeed, one side will hold the old counting value, whereas the other side will hold a new counting value (e.g., previous value+1). Now, when the subscriber terminal requests activation of the respective PSC or when the BS activates the PSC, the PSC's counter is also transmitted in the activation message and helps verifying that both sides are synchronized, i.e., both sides hold the same PSC's definition. If the counter is not equal in both sides then the PSC is deactivated and a re-definition procedure may be initiated.

By another preferred embodiment of the present invention, the method provided further comprising a step of both sides reporting their respective PSCs counting values, to confirm the current PSCs' status thereat. Preferably, the step of reporting is carried out in a repetitive manner.

Naturally, the method provided by the present invention can also be implemented in cases where the request to affect a change in the respective PSC, is a request to release that PSC. In such cases, the message comprising a request to affect a change in the power saving status will include an indication that the PSC is no longer in use.

Such an implementation may also be used to prevent synchronization loss between the BS and subscriber terminal. For example, if the BS needs to change the definition of a certain PSC, it first releases the PSC and informs the subscriber terminal accordingly, and then it defines a new PSC with a new Power_Saving_Class_ID. This way if the subscriber terminal and the BS do not hold the same PSCs counting value (i.e., the terminal still holds the released PSC), then the activation of the new PSC will not succeed (as the terminal does not hold this Power_Saving_Class_ID), or the activation of the released PSC will not succeed (as the BS no longer holds the Power_Saving_Class_ID), however once both sides realize that, each may initiate repeating over the process.

According to another aspect of the invention there is provided a subscriber terminal adapted to operate in a wireless network which comprising:

an interface operative to allow communication between the subscriber terminal and a base station;

at least one radio transceiver operative to transmit communication traffic towards the base station and receive communication traffic therefrom;

at least one processor adapted to exchange messages with the base station for synchronizing changes affected to at least one Power Saving Class (PSC) associated with the subscriber terminal, whether these changes were affected in either one of the subscriber device or the base station, or both; and a power controller operative to affect a reduction in the power of the at least one radio transceiver for the duration of time periods during which no communication will be exchanged between the base station and the subscriber terminal.

In accordance with another embodiment of this aspect of the invention, the processor is adapted:

to set a counting value for at least one PSCs operative in that subscriber terminal to be equal to a pre-defined initial value; and upon receiving from or initiating transmission to the base station of a message identifying a change in the at least one PSC, to update operating parameters associated with that at least one PSC and to increase the counting value of the corresponding at least one PSC by a predetermined value.

Preferably, the processor is further adapted to:

derive from a message transmitted by the base station, indication of the counting value associated with that PSC currently available at the base station; and determine whether the counting value currently available at the base station matches that at the subscriber terminal, and if in the affirmative, initiate a change in that PSC.

According to another preferred embodiment of the present invention, the subscriber terminal is operative in accordance with at least two different power saving classes (PSCs), each of which is associated with respective traffic related characteristics.

According to yet another aspect of the invention there is provided a base station adapted to operate in a wireless network and comprising:

an interface operative to allow communications between the base station and at least one subscriber terminal;

at least one radio transceiver capable of transmitting communication traffic towards the at least one subscriber terminal and receiving communication traffic therefrom;

at least one processor adapted to:

exchange messages with the subscriber terminal for synchronizing changes effected to a Power Saving Class (PSC) in either the subscriber device or in the base station, or in both; and determine unavailability windows of time for the subscriber terminal in which no communication will be exchanged between the base station and the subscriber terminal.

In accordance with another embodiment of this aspect of the invention, the processor is adapted:

to set a counting value for at least one PSCs operative in at the subscriber terminal to be equal to a pre-defined initial value; and upon receiving from or initiating transmission to the subscriber terminal of a message identifying a change in the at least one PSC, to increase the counting value of the corresponding at least one PSC by a pre-determined value.

Preferably, the processor is further adapted to:

derive from a message transmitted by the subscriber terminal an indication of the counting value associated with that PSC currently available at the subscriber terminal; and determine whether the counting value currently available at the subscriber terminal matches that of the base station, and if in the affirmative, to update operating parameters associated with that at least one PSC.

A DETAILED DESCRIPTION OF PREFERRED EMBODIMENTS

PSC with Change-Counter

Both the subscriber terminal and the BS keep a change-counter (CC) for every PSC defined. The CC is initialized at both sides (BS and terminal) by setting to 0 upon the first definition, and incremented, also at both sides, upon every successful re-definition.

The following three methods may be used to deliver the PSC CC:

Through a new TLV;
Included in the Power_Saving_Class_ID field of the existing MOB_SLP-REQ/RSP messages; or
Indicated by a new field in the MOB_SLP-REQ/RSP messages.

By the first option, a TLV is used to indicate the version of a PSC definition. Hence, every TLV includes a Power_Saving_Class_ID and its relevant CC value. For example, the TLV can be composed of 1 data bytes, as described in Table 6. In this example, the TLV value includes 6 bits of the Power_Saving_Class_ID, and two bits for the PSC CC. Another possible example is using more than 1 byte as detailed in Table 7. In this example 6 bits are used to Power_Saving_Class_ID and 6 additional bits for the representation of the PSC CC. Using this more than 1 byte representation, enables more flexibility regarding the number of possible changes of a PSC.

The TLVs need to be included in the MOB_SLP-REQ and MOB_SLP-RSP to indicate the status of PSCs.

The second and third methods make use of a field comprised in the MOB_SLP-REQ/RSP messages, to indicate the CC of a certain PSC. The new field can use the current standard representation of the messages, or it can create a new format of the messages. For example, Tables 1 and 2 present the existing 802.16e sleep-mode messages with the addition of PSC CC. The Power_Saving_Class_ID field was reduced to 4 bits (from 6 bits) and the 2 bits are used for the PSC CC field, and Table 8 shows details of the addition of new PSC CC field in the MOB_SLP-REQ and MOB_SLP-RSP messages.

Next, the operational ways to use the aforementioned methods are exemplified. When a terminal requests the redefinition of a PSC, it increments the local PSC's CC value, and sends a MOB_SLP-REQ message with definition request, the relevant PSC ID and the new CC value (either by using the modified MOB_SLP-REQ with the CC field, or by adding the proposed TLVs to the existing MOB_SLP-REQ). Upon reception of the message and approval of the redefinition, the BS increments its local PSC's CC value, and sends MOB_SLP-RSP with the Approve bit set to 1, the PSC ID and the new CC value (either by using modified MOB_SLP-RSP, or by adding the proposed TLVs to the existing MOB_SLP-RSP). When the terminal receives the message it updates the PSC's definitions and stores the PSC's new CC value.

Figure 1:
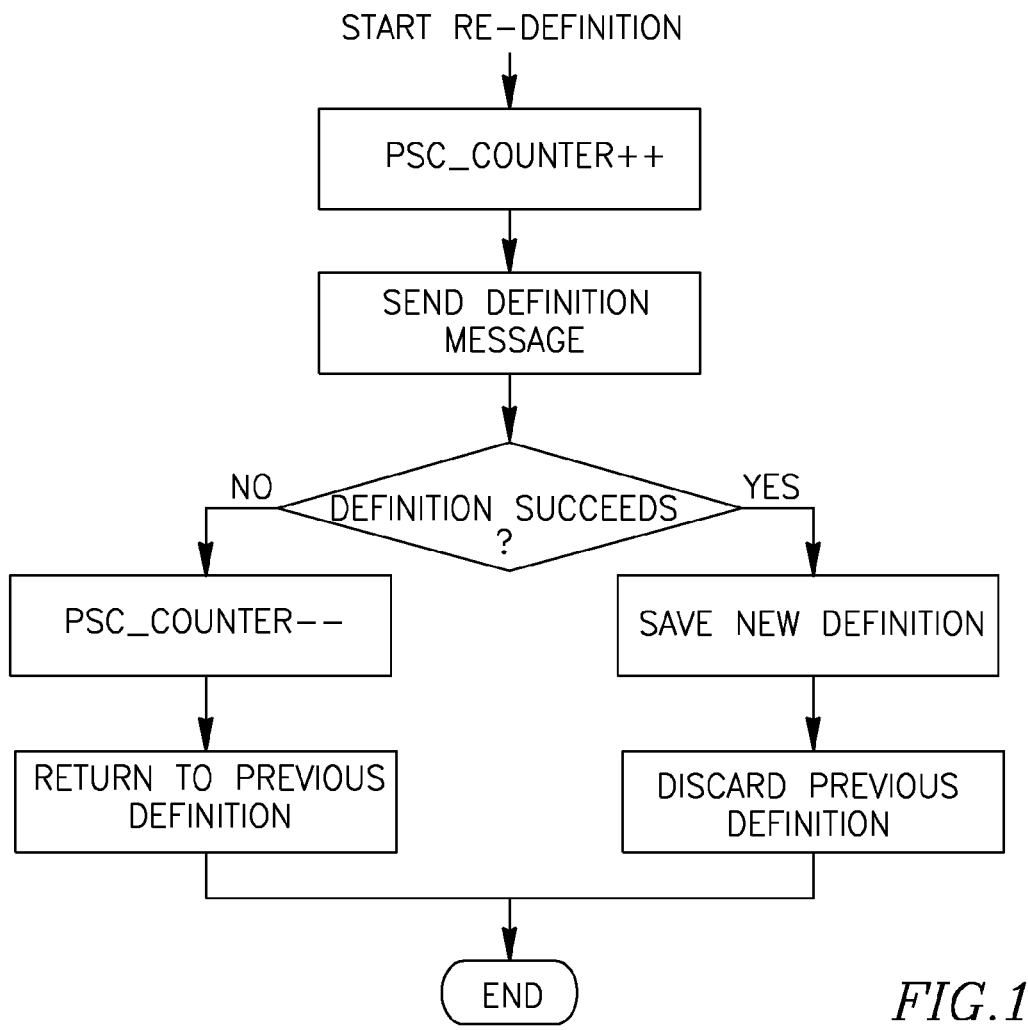
FIG. 1 illustrates a flow chart of a PSC re-definition procedure at the terminal side.

If the BS denied the redefinition, then it sends a MOB_SLP-RSP with Approve bit set to 0 and does not change the PSC's definition and CC value. When the terminal receives the MOB_SLP-RSP message, it detects that the redefinition has not been approved, and fallbacks to the previous definition of the PSC and previous value of the CC. FIG. 1 illustrates the terminal PSC redefinition process.

Figure 2:
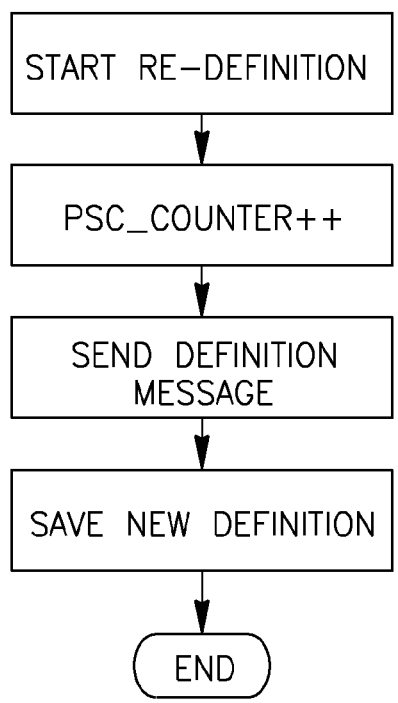
FIG. 2 illustrates a flow chart of a PSC re-definition procedure at the base station side.

When a BS redefines a PSC in an unsolicited manner, it first increments the PSC's CC, and sends a MOB_SLP-RSP with the new definitions, the PSC ID and the new CC value (either by using the proposed MOB_SLP-RSP, or by adding the proposed TLVs to the existing MOB_SLP-RSP). Upon reception of the MOB_SLP-RSP message, the terminal updates the PSC's definitions and local CC value. FIG. 2 depicts the BS redefinition process.

When re-definition procedure succeeds, both sides have incremented the counting value, i.e. the counter (as both sides receive the re-definition message and agreed on its content), so that both sides hold the same CC value and PSC parameters. When the re-definition procedure fails one side holds the previous values of the PSC and the CC and the other side holds the new PSC definitions and the new value of the CC (previous value+1). Thus upon activation of the out-of-synchronization PSC, one of the sides will detect the differences in the CC values, and will initiate a deactivation and redefinition procedures to prevent the use of unsynchronized PSC and to synchronized the PSC's definition at both sides.

Figure 3:
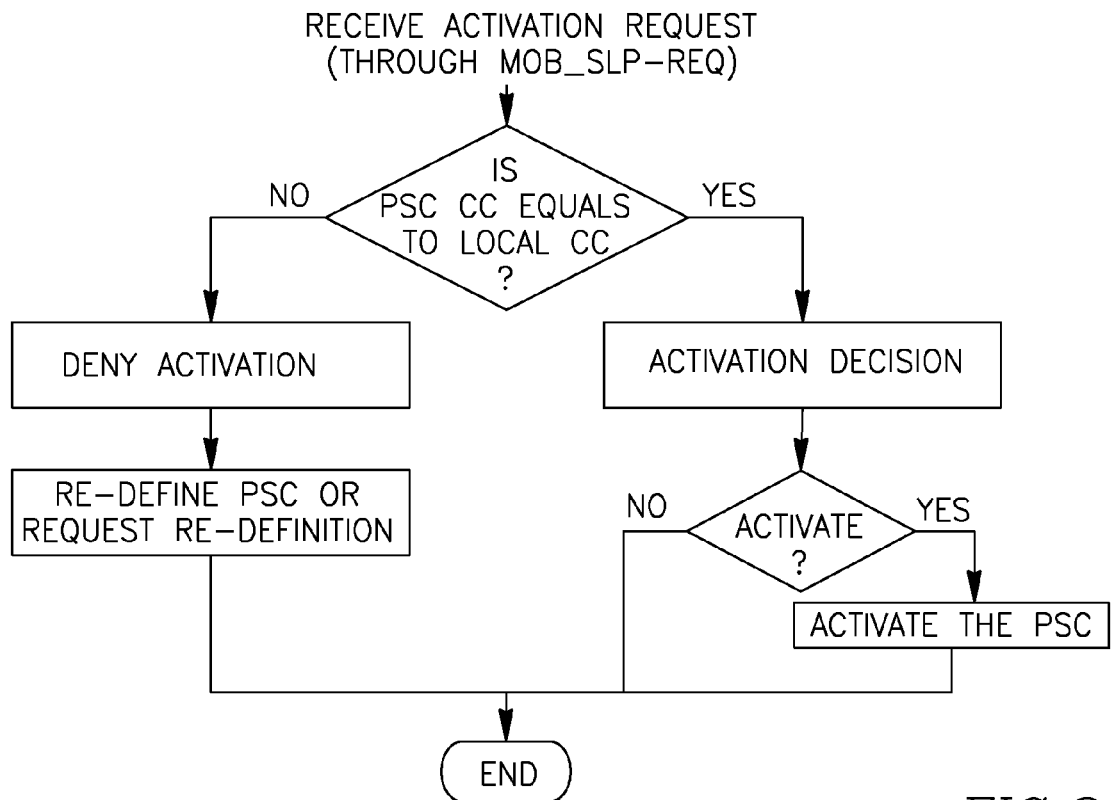
FIG. 3 illustrates a flow chart of a Base Station Configuration Change Count (CC) verification procedure upon receiving an activation request.
Figure 4:
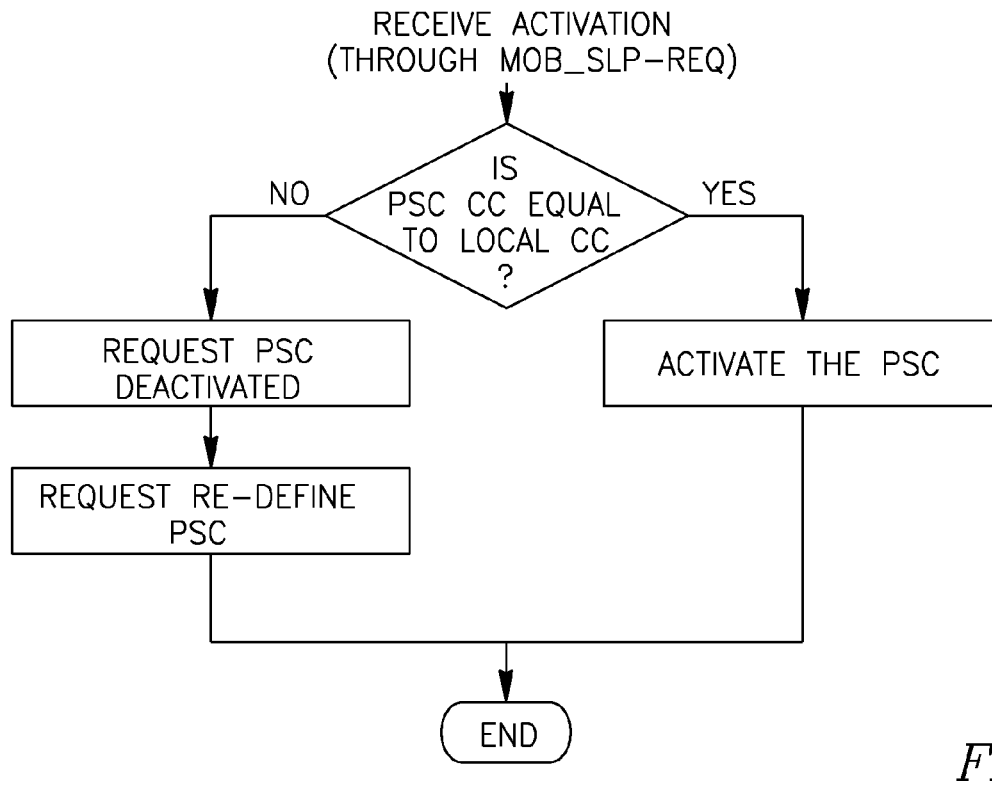
FIG. 4 illustrates a flow chart of a subscriber device CC verification procedure upon receiving a PSC activation command.
Figure 5:
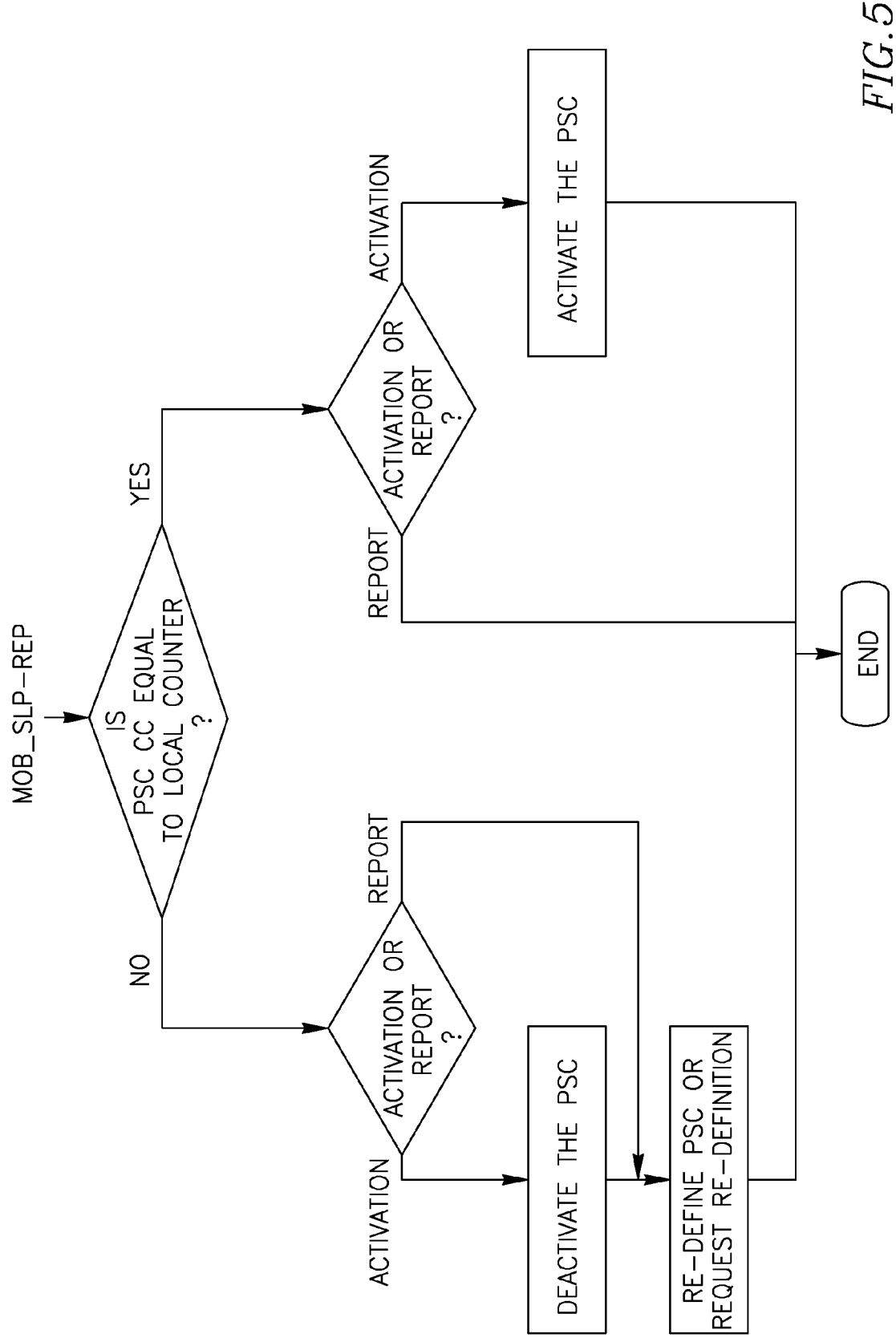
FIG. 5 illustrates a flow chart of an exemplified reporting procedure in accordance with the present invention.

In addition, both sides can initiate (independently) PSC status verification procedure using MOB_SLP-REP. The message include a list of PSCs, for every PSC its ID and CC is included as well as an indication on its activity status (currently active or not). Examples of such message are provided in Table 5 and Table 10. FIGS. 3 and 4 illustrate the CC verification upon activation, at the terminal side and BS side respectively. FIG. 5 presents a flow chart of an exemplified reporting procedure in accordance with one embodiment the present invention.

As illustrated in FIG. 5, when the BS receives a report message it verifies if there is a PSC with CC (from the message) that is not equal to the locally stored CC. Upon detection of such PSCs, the BS initiates a re-definition procedure. When the terminal receives a report message, it also verifies if there is a PSC with CC (from the message) that is not equal to the locally stored CC. Upon detection of such PSCs, the terminal initiates a re-definition procedure.

PSC Activation

According to 802.16e PSC can be activated by either the BS commanding or the subscriber terminal requesting (and the BS approves). A BS can activate a PSC by either transmitting unsolicited MOB_SLP-RSP or by transmitting Downlink sleep control extended sub-header. A subscriber terminal (an MS) can request the activation of a PSC by either transmitting a MOB_SLP-REQ or by transmitting Bandwidth control and uplink sleep control header.

Using the indication of PSC CC in the messages, the BS and terminal can verify their synchronization prior to the activation of a PSC:

Terminal PSC activation: When the subscriber terminal requests activation of the PSC it transmits either a MOB_ SLP-REQ or a bandwidth request and uplink sleep control header that includes the PSC ID and PSC CC into the message. When the BS receives the subscriber terminal's request for activation, it verifies the PSC CC value. If the PSC CC is not equal to its local CC value, it shall not approve the activation of sleep-mode and initiates a redefinition procedure.

BS PSC activation: When the BS activates the PSC either by transmitting MOB_SLP-RSP or by transmitting Downlink sleep control extended sub-header, it includes the PSC's ID and CC value into the messages. When the subscriber terminal receives the MOB_SLP-RSP message or the Downlink sleep control extended sub-header for activation. It verifies the CC value. If the PSC CC value is not equal to the local one, the subscriber terminal will request the deactivation of the PSC and then initiate a redefinition procedure.

Examples of Downlink sleep control extended sub-header are detailed in Table 4 and Table 12, and examples of bandwidth request and uplink sleep control header are presented in Tables 3 and 11.

Releasing a PSC

Instead of re-defining a PSC, the BS or subscriber terminal can release the PSC and then define a new PSC that includes the new definitions with a new ID. Later on, the terminal and/or BS can reuse the PSC ID for the definition of a new PSC.

The release procedure is similar to the definition/activation/deactivation procedures currently defined in the art, and it uses request and response messages that are known.

If a subscriber terminal requests the release of a PSC, it transmits a request message. Upon reception of such message, the BS verifies if the PSC can be released and transmits back to the terminal a response message indicating if the release was approved (Approve bit set to 1) or denied (Approve bit set to 0). In addition, in case of PSC release approval, the BS marks the PSC ID as released. When the subscriber terminal receives the BS's reply message, it checks if the request was approved. If the BS approved the release the subscriber terminal marks that the PSC ID as released.

If a BS requires the release of a certain PSC ID, it transmits to the terminal a response message in an unsolicited manner indicating the PSC ID to be released. Upon reception of the response message, the terminal extracts the PSC ID and marks it as released.

Another possible utilization of the release messages is using a symmetric protocol between the BS and terminal. This manner of operation allows both sides to use the messages in a similar way of request and response transaction. The BS or terminal transmits a release request message, and then waits for the other side to reply with a response message.

Examples of request and response messages are provided in Tables 13 and 14. Table 13 depicts a release request message (MOB_SLP_RLS-REQ) that a terminal can transmit to the BS to request a PSC release. Table 14 presents a release response message (MOB_SLP_RLS-RSP) that a BS can transmit as a response to the terminal's release request, indicating which PSCs releases were approved, or the BS can transmit the message in an unsolicited manner indicating which PSCs should be released.

PSC Activation

As described in above, a PSC may be activated by either the subscriber terminal or BS. A synchronization loss, i.e., where the subscriber terminal holds a PSC that was previously released, can occur when either the subscriber terminal does not receive an unsolicited release message previously transmitted by the BS, or when the subscriber terminal does not receive the BS response approval to a release request of the subscriber terminal. If the BS receives activation request message from the terminal of a PSC that is marked as released, the BS retransmits the release response message to the subscriber terminal indicating the PSC ID. Upon reception of the release request message, the subscriber terminal stops the activation procedure and releases the PSC. If the subscriber terminal receives activation message from the BS with PSC ID marked as released, it sends a release request message to the BS indicating the PSC ID.

In addition, each side can initiate a PSC status verification procedure using reporting messages, for example a message like MOB_SLP-REP is presented in Table 15. The message include a list of PSCs, for every PSC its ID and if it is released and if it is currently active. Upon reception of such message the BS and the terminal can verify if their PSC view is aligned with the other side.

If the subscriber terminal detects that the BS holds PSCs that were already released, it requests their release from the BS, using a release request message, which is approved by the BS.

If the BS detects that the subscriber terminal holds PSCs that were released, it transmits a release response message (in an unsolicited manner) indicating the release of the PSCs.

Reusing PSC IDs

A previously released PSC ID can be used for a new set of definitions. In this case there is a possibility that the BS and terminal will have a synchronization problem, for example if both the BS's release and redefinition fails.

To resolve this problem, one more embodiment of the invention is suggested that combines release function with usage of CC incorporated into the release and redefinition messages. Every subscriber terminal and BS will hold a list of released PSC ID and their last CC.

When a released PSC is redefined, the stored CC is incremented. When an activation message is received, the subscriber terminal or BS verifies that the PSC is not released and that the CC in the message equals to the local CC value. In case of synchronization loss (CC values do not match) a release procedure is initiated.

TABLE 1

Example of MOB_SLP-REQ message with 2 bits CC and 4 bits PSC ID

| Syntax | Size |
|---|---|
| MOB_SLP-REQ_Message_format( ) { | — |
|   Management message type = 50 | 8 bits |
|   Number of Classes | 8 bits |
|   for (i=0; i< Number of Classes; i++) { | — |
|     Definition | 1 bits |
|     Operation | 1 bits |
|     Power_Saving_Class_ID | 4 bits |
|     Change Counter | 2 bits |
|     if (Operation = 1) { | — |
|       Start_frame_number | 7 bits |
|       Reserved | 1 bit |
|     } | |
|     if (Definition = 1) { | — |
|       Power_Saving_Class_Type | 2 bits |
|       Direction | 2 bits |

TABLE 1-continued

Example of MOB_SLP-REQ message with 2 bits
CC and 4 bits PSC ID

| Syntax | Size |
|---|---|
|         TRF-IND_Required | 1 bit |
|         Traffic_triggered_wakening_flag | 1 bit |
|         Reserved | 2 bits |
|         initial-sleep window | 8 bits |
|         listening-window | 8 bits |
|         final-sleep window base | 10 bits |
|         final-sleep window exponent | 3 bits |
|         Number_of_CIDs | 3 bits |
|         for (j=0; j<Number_of_CIDs; j++ ){ | — |
|             CID | 16 bits |
|         } | — |
|     } | — |
| } | — |
|     TLV Encoded Information | Variable |
| } | — |

TABLE 2

Example of MOB_SLP-RSP message with 2 bits CC and 4 bits PSC ID

| Syntax | Size |
|---|---|
| MOB_SLP-RSP_Message_format( ) { | — |
|   Management message type = 51 | 8 bits |
|   Number of Classes | 8 bits |
|   for (i=0; i< Number of Classes; i++) { | — |
|     Length of Data | 7 bits |
|     Sleep Approved | 1 bits |
|     Definition | 1 bits |
|     Operation | 1 bits |
|     Power_Saving_Class_ID | 4 bits |
|     Change Counter | 2 bits |
|     if (Sleep Approved == 1) { | — |
|       if (Operation == 1) { | — |
|         Start_frame_number | 7 bits |
|         Stop_CQI_Allocation_Flag | 1 bit |
|       } | — |
|       if (Definition = 1) { | — |
|         initial-sleep window | 8 bits |
|         listening-window | 8 bits |
|         final-sleep window base | 10 bits |
|         final-sleep window exponent | 3 bits |
|         Traffic_triggered_wakening_flag | 1 bit |
|         Power_Saving_Class_Type | 2 bits |
|         Direction | 2 bits |
|         TRF-IND_Required | 1 bit |
|         Reserved | 1 bits |
|         Number_of_CIDs | 4 bits |
|         for (j=0; j<Number_of_CIDs; j++ ){ | — |
|             CID | 16 bits |
|         } | — |
|         if( TRF-IND required ){ | — |
|             SLPID | 10 bits |
|             Reserved | 2 bits |
|             if (MDHO or FBSS capability enabled) { | — |
|                 Maintain Diversity Set and Anchor BS | 1 bit |
|                 if (Maintain Diversity Set and Anchor BS) { | — |
|                     MDHO/FBSS duration (s) | 3 bits |
|                 } | — |
|             } | — |
|         } | — |
|       Padding | Variable |
|     }else{ | — |
|       REQ-duration | 8 bits |
|     } | — |
|   } | — |
|   TLV Encoded Information | Variable |
| } | — |

TABLE 3

Example of Bandwidth control and uplink sleep control
header with 2 bits CC and 4 bits PSC ID

| Name | Size |
|---|---|
| Type | 3 bits |
| BR | 11 bits |
| Power_Saving_Class_ID | 4 bits |
| Change Counter | 2 bits |
| Operation | 1 bit |
| Reserved | 1 bit |
| CID | 16 bits |
| HCS | 8 bits |

TABLE 4

Example of Downlink sleep control extended sub-header
with 2 bits CC and 4 bits PSC ID

| Name | Size |
|---|---|
| Power_Saving_Class_ID | 4 bits |
| Change Counter | 2 bits |
| Operation | 1 bit |
| Final_Sleep_Window_Exponent | 3 bits |
| Final_Sleep_Window_Base | 7 bits |
| Stop_CQI_Allocation_Flag | 1 bit |
| Start frame | 6 bits |

TABLE 5

Example of MOB_SLP-REP message with 2 bits CC and 4 bits PSC ID

| Syntax | Size |
|---|---|
| MOB_SLP-REP_Message_format( ) { | — |
|   Management message type | 8 bits |
|   Number of Classes | 8 bits |
|   for (i=0; i< Number of Classes; i++) { | — |
|     Power_Saving_Class_ID | 4 bits |
|     Change Counter | 2 bits |
|     Active | 1 bit |
|     Reserved | 1 bit |
|   } | — |
|   TLV Encoded Information | Variable |
| } | — |

TABLE 6

Example of 1 byte PSC tracking TLV

| Type | Length | Value | Scope |
|---|---|---|---|
| — | 1 | 0-5: PSC ID<br>6-7: PSC CC | MOB_SLP-REQ/RSP |

TABLE 7

Example of 2 bytes PSC tracking TLV

| Type | Length | Value | Scope |
|---|---|---|---|
| — | 2 | 0-5: PSC ID<br>6-11: PSC CC<br>12-15: Reserved | MOB_SLP-REQ/RSP |

TABLE 8

Example of MOB_SLP-REQ message with 8 bits CC field and 6 bits PSC ID field

| Syntax | Size |
|---|---|
| MOB_SLP-REQ_Message_format( ) { | — |
|   Management message type = 50 | 8 bits |
|   Number of Classes | 8 bits |
|   for (i=0; i< Number of Classes; i++) { | — |
|     Definition | 1 bits |
|     Operation | 1 bits |
|     Power_Saving_Class_ID | 6 bits |
|     Change Counter | 8 bits |
|     if (Operation = 1) { | — |
|       Start_frame_number | 7 bits |
|       Reserved | 1 bit |
|     } | |
|     if (Definition = 1) { | — |
|       Power_Saving_Class_Type | 2 bits |
|       Direction | 2 bits |
|       TRF-IND_Required | 1 bit |
|       Traffic_triggered_wakening_flag | 1 bit |
|       Reserved | 2 bits |
|       initial-sleep window | 8 bits |
|       listening-window | 8 bits |
|       final-sleep window base | 10 bits |
|       final-sleep window exponent | 3 bits |
|       Number_of_CIDs | 3 bits |
|       for (j=0; j<Number_of_CIDs; j++ ){ | — |
|         CID | 16 bits |
|       } | |
|     } | |
|   } | |
|   TLV Encoded Information | variable |
| } | |

TABLE 9

Example of MOB_SLP-RSP message with 8 bits CC field and 6 bits PSC ID field

| Syntax | Size |
|---|---|
| MOB_SLP-RSP_Message_format( ) { | — |
|   Management message type = 51 | 8 bits |
|   Number of Classes | 8 bits |
|   for (i=0; i< Number of Classes; i++) { | — |
|     Length of Data | 7 bits |
|     Sleep Approved | 1 bits |
|     Definition | 1 bits |
|     Operation | 1 bits |
|     Power_Saving_Class_ID | 6 bits |
|     Change Counter | 8 bits |
|     if (Sleep Approved == 1) { | — |
|       if (Operation == 1) { | — |
|         Start_frame_number | 7 bits |
|         Stop_CQI_Allocation_Flag | 1 bit |
|       } | — |
|       if (Definition = 1) { | — |
|         initial-sleep window | 8 bits |
|         listening-window | 8 bits |
|         final-sleep window base | 10 bits |
|         final-sleep window exponent | 3 bits |
|         Traffic_triggered_wakening_flag | 1 bit |
|         Power_Saving_Class_Type | 2 bits |
|         Direction | 2 bits |
|         TRF-IND_Required | 1 bit |
|         Reserved | 1 bits |
|         Number_of_CIDs | 4 bits |
|         for (j=0; j<Number_of_CIDs; j++ ){ | — |
|           CID | 16 bits |
|         } | |
|         if( TRF-IND required ){ | — |
|           SLPID | 10 bits |
|           Reserved | 2 bits |
|           if (MDHO or FBSS capability enabled) { | — |
|             Maintain Diversity Set and Anchor BS | 1 bit |
|           if (Maintain Diversity Set and Anchor BS) { | — |
|             MDHO/FBSS duration (s) | 3 bits |
|           } | — |
|         } | — |
|       } | — |
|       Padding | Variable |
|     }else{ | — |
|       REQ-duration | 8 bits |
|     } | — |
|   } | — |
|   TLV Encoded Information | Variable |
| } | — |

TABLE 10

Example of MOB_SLP-REP with 8 bits CC and 6 bits PSC ID

| Syntax | Size |
|---|---|
| MOB_SLP-REP_Message_format( ) { | — |
|   Management message type | 8 bits |
|   Number of Classes | 8 bits |
|   for (i=0; i< Number of Classes; i++) { | — |
|     Power_Saving_Class_ID | 6 bits |
|     Change Counter | 8 bits |
|     Active | 1 bit |
|     Reserved | 1 bit |
|   } | — |
|   TLV Encoded Information | variable |
| } | — |

TABLE 11

Example of Bandwidth control and uplink sleep control header with 8 bits CC and 6 bits PSC ID.

| Name | Size |
|---|---|
| Type | 3 bits |
| BR | 11 bits |
| Power_Saving_Class_ID | 6 bits |
| Change Counter | 8 bits |
| Operation | 1 bit |
| CID | 16 bit |
| HCS | 8 bits |
| Reserved | 1 bits |

TABLE 12

Example of Downlink sleep control extended sub-header with 8 bits CC and 6 bits PSC ID

| Name | Size |
|---|---|
| Power_Saving_Class_ID | 6 bits |
| Change Counter | 8 bits |
| Operation | 1 bit |
| Final_Sleep_Window_Exponent | 3 bits |
| Final_Sleep_Window_Base | 7 bits |
| Stop_CQI_Allocation_Flag | 1 bit |
| Start frame | 6 bits |

TABLE 13

Example of PSC release request message

| Syntax | Size |
|---|---|
| MOB_SLP_RLS-REQ _Message_format( ) { | — |
|   Management message type | 8 bits |
|   Number of Classes | 8 bits |
|   for (i=0; i< Number of Classes; i++) { | — |
|     Power_Saving_Class_ID | 6 bits |
|     Reserved | 2 bit |
|   } | — |
|   TLV Encoded Information | Variable |
| } | — |

TABLE 14

Example of PSC release response message

| Syntax | Size |
|---|---|
| MOB_SLP_RLS-RSP _Message_format( ) { | — |
|   Management message type | 8 bits |
|   Number of Classes | 8 bits |
|   for (i=0; i< Number of Classes; i++) { | — |
|     Power_Saving_Class_ID | 6 bits |
|     Approve | 1 bit |
|     Reserved | 1 bit |
|   } | — |
|   TLV Encoded Information | Variable |
| } | — |

TABLE 15

Example of MOB_SLP-REP

| Syntax | Size |
|---|---|
| MOB_SLP-REP_Message_format( ) { | — |
|   Management message type | 8 bits |
|   Number of Classes | 8 bits |
|   for (i=0; i< Number of Classes; i++) { | — |
|     Power_Saving_Class_ID | 6 bits |
|     Released | 1 bit |
|     Active | 1 bit |
|   } | — |
|   TLV Encoded Information | Variable |
| } | — |

As will be appreciated by those skilled in the art, the examples provided show methods and devices for improving the power saving methods known in the art. However, it should be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

Furthermore, the terms "comprise", "include", "have" and their conjugates shall mean, when used in the claims "including but not necessarily limited to". Also when term was used in the singular form it should be understood to encompass its plural form and vice versa, as the case may be.

The invention claimed is:

1. A method for use in a wireless communication network for affecting changes in a power saving class (PSC) associated with a subscriber terminal and a corresponding base station, that are located at different ends of a communication link, the method comprises the steps of:
   providing at least one defined PSC for use by said subscriber terminal and said base station;
   at both of said subscriber terminal and said corresponding base station, setting the same counting value for a specific PSC from said at least one PSC to be equal to a predetermined initial value, such that saw counting value corresponds to a specific PSC that is currently being used;
   at one end of said communication link, when a change of the specific PSC from among said at least one PSC is to be affected, incrementing the counting value at the one end to another known predetermined value and transmitting a message towards the other end of said communication link, identifying said change in the specific PSC at the one end; and
   at the other end of the communication link, upon receiving said message, updating one or more operating parameters associated with that specific PSC and incrementing the counting value at the other end associated with the specific PSC to a pre-determined value so that when the counting values at both the BS and the subscriber terminal are the same value, both the BS and die subscriber terminal have been provided with the same definitions of the specific PSC.

2. The method according to claim 1, further comprising transmitting a message which comprises a request to affect a change in power saving status of said subscriber terminal, wherein said message comprises an indication of the counting value associated with the specific PSC currently available at the end transmitting said message; and
   upon receiving said message comprising the request to affect a change in said power saving status, determining whether the counting value associated with the current PSC at the receiving end matches the counting value associated with the specific PSC at the end transmitting said message, and if in the affirmative, evaluating whether said requested change may be carried out.

3. The method according to claim 2, wherein at least two different power saving classes (PSCs), each or which is associated with respective traffic related characteristics, are operative at said subscriber terminal, and wherein said message transmitted in the step of transmitting a message comprising a request to affect a change in the power saving status, comprises an indication identifying the specific PSC for which the request for a change was transmitted.

4. The method according to claim 1, further comprising a step of both ends reporting their respective PSCs counting values and wherein this step of reporting is carried out in a repetitive manner.

5. The method according to claim 1, further comprising upon incrementing the counting value at the other end of the communication link, indicating to the entity located at the one end of the communication link the new counting value, and upon confirming that the counting value at both ends is equal, activating said specific PSC after affecting said change thereat.

6. The method according to claim 1, further comprising transmitting a message from the subscriber terminal to the base station which comprises a request to affect a change in power saving status of said subscriber terminal, wherein said message comprises an indication of the counting value associated with the specific PSC currently available at the subscriber terminal.

7. The method according to claim 1, further comprising upon incrementing the counting value at the subscriber terminal, indicating to the base station the new counting value, and upon confirming that the counting value at the subscriber terminal and the base station are equal, activating said specific PSC after affecting said change thereat.

8. The method according to claim 1, further comprising transmitting a message from the base station to the subscriber terminal which comprises a request to affect a change in power saving status of said base station, wherein said message comprises an indication of the counting value associated with the specific PSC currently available at the base station.

9. The method according to claim 1, further comprising upon incrementing the counting value at the subscriber terminal, indicating to the subscriber terminal the new counting value, and upon confirming that the counting value at the subscriber terminal and the base station are equal, activating said specific PSC after affecting said change thereat.

10. The method according to claim 2 wherein when the determination of whether the counting value associated with the current PSC at the receiving end matches the counting value associated with the specific PSC at the end transmitting said message, is in the negative, then denying the request and initiating a re-definition procedure.

11. The method according to claim 8, further comprising upon receiving, at the subscriber terminal, said message comprising the request to affect a change in said power saving status, determining whether the counting value associated with the current PSC at the subscriber terminal matches the counting value associated with the specific PSC at the base station, and if in the affirmative, evaluating whether said requested change may be carried out.

12. The method according to claim 6, further comprising upon receiving, at the base station, said message comprising the request to affect a change in said power saving status, determining whether the counting value associated with the current PSC at the base station matches the counting value associated with the specific PSC at the subscriber terminal, and if in the affirmative, evaluating whether said requested change may be carried out.

* * * * *

UNITED STATES PATENT AND TRADEMARK OFFICE
CERTIFICATE OF CORRECTION

PATENT NO. : 8,706,103 B2  
APPLICATION NO. : 12/187566  
DATED : April 22, 2014  
INVENTOR(S) : Lavi Page 1 of 1

It is certified that error appears in the above-identified patent and that said Letters Patent is hereby corrected as shown below:

In the Claims

Column 14, Line 4, Claim 1, delete "saw" and insert therefor, --said--.

Column 14, Line 20, Claim 1, delete "die" and insert therefor, --the--.

Column 14, Line 38, Claim 3, delete "or" and insert therefor, --of--.

Signed and Sealed this  
Fifth Day of August, 2014

Michelle K. Lee  
*Deputy Director of the United States Patent and Trademark Office*